Nov. 9, 1965  C. I. BOHLEN  3,216,758

POST AND SHEET PANEL CONSTRUCTION FOR VEHICLE BODY

Filed Aug. 13, 1963

INVENTOR.
CHARLES I. BOHLEN
BY
Millman and Jacobs
ATTORNEYS

United States Patent Office 3,216,758
Patented Nov. 9, 1965

3,216,758
POST AND SHEET PANEL CONSTRUCTION
FOR VEHICLE BODY
Charles I. Bohlen, Doylestown, Pa., assignor to Strick
Trailers, a Division of Fruehauf Trailer Co., Philadelphia, Pa., a corporation of Michigan
Filed Aug. 13, 1963, Ser. No. 301,734
6 Claims. (Cl. 296—28)

This invention relates to an over-the-road vehicle or trailer of the type employing spaced metallic vertical posts and metallic sheet panels secured thereto and extending there-between to form the side and end walls of the body.

Heretofore, the sheet panels were secured to the posts by riveting or spot welding. In the riveting process, holes were preformed in both the sheet panels and posts and progressively joined through aligned holes by rivets, a costly assembly procedure. In the spot welding process, which is relatively rapid, certain pre-conditions to provide adequate weld strength are required and the provision and maintenance of these pre-conditions as well as the welding equipment is also very costly.

It is the primary object of this invention to provide an integral rivet means to join the sheet panels to the posts and to each other, where required, which eliminates the need for conventional riveting or spot welding, which is considerably less costly than these methods and which produces a joint that is at least equal and at times superior to the strength of a separate rivet.

Another object of the invention is to provide an integral rivet connection between overlapping metallic members of a vehicle body which is made by applying a punch to one member whereby a hole is formed in the other member while material from the one member is simultaneously extruded through the hole and upending the extruded material to form a head to complete the joint.

Another object of the invention is to provide an integral rivet connection of the character above described wherein the punch employed to shear and extrude material from one member through the other is substantially cylindrical and includes a head which is substantially planar and perpendicular to the axis of the punch, so that lateral extruding forces are minimized and the axial extruding force is maximized thereby resulting in the formation of a very strong projection through the other member.

Another object of the invention is to provide an integral rivet of the character described in which the ratio of the thickness of the upper sheet to the lower sheet, the extent of penetration of the punch into the thicker upper sheet as compared to the thickness of the thinner lower sheet, the ratio of the diameter of the slug formed to the thickness of the lower sheet and the ratio of the diameter of the punch to the slug determine the strength of the integral rivet produced.

Yet another object of the invention is to provide an integral rivet connection between sheets and posts in a vehicle body which require but one die set and one press to form them, thereby effecting an important manufacturing economy.

These and other objects of the invention will become more apparent as the following description proceeds in conjunction with the accompanying drawing, wherein.

Specific reference is now made to the drawings wherein similar reference characters are used for corresponding elements throughout.

Figure 1:
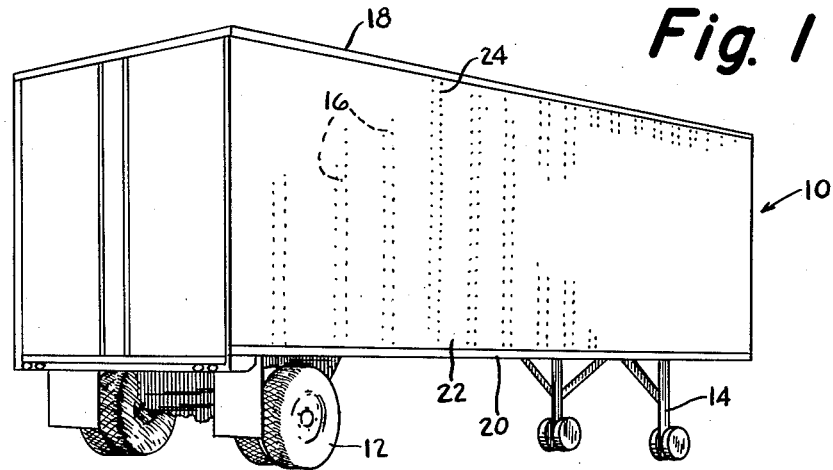
FIGURE 1 is a perspective view of a trailer body embodying the invention.
Figure 2:
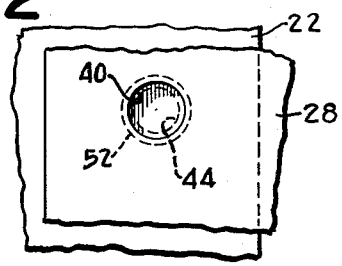
FIG. 2 is a front view of the integral rivet.
Figure 3:
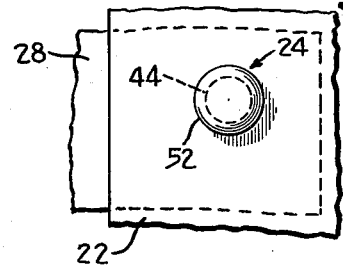
FIG. 3 is a rear view of the integral rivet.
Figure 4:
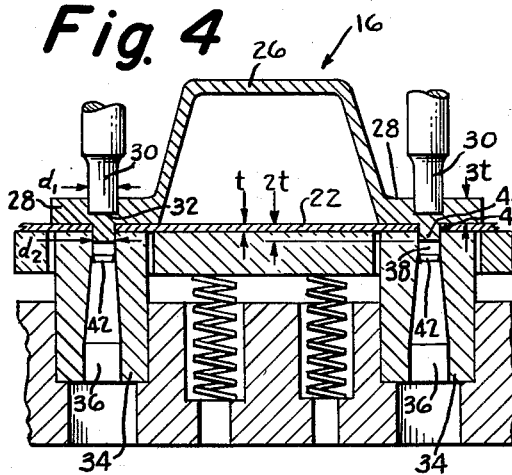
FIG. 4 is a horizontal sectional view through the post and sheet illustrating the punching and extrusion step in the formation of the rivet slug.
Figure 5:
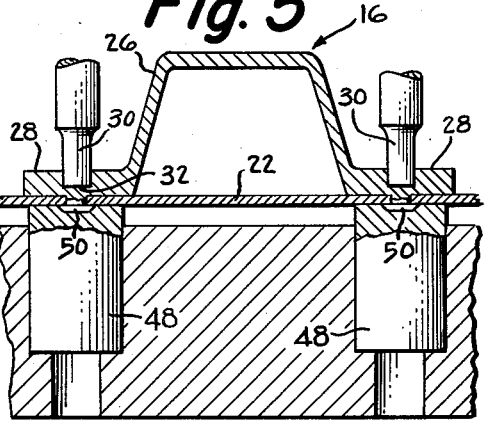
FIG. 5 is a view similar to FIG. 4 illustrating the upending or heading step to complete the rivet.

Indicated generally at 10 is a vehicle body in the form of a semi-trailer shown supported upon rear running gear 12 and front landing gear 14. The construction of the sides of the body is such that longitudinally spaced vertical metallic posts 16 are provided between top and bottom longitudinal rails 18 and 20 and metallic sheet panels 22 are secured by the integral rivet means 24 of the instant invention to and extend between adjacent posts. It will be seen that the post is preferably hat-shaped in cross section and therefore contains a web portion 26 and lateral flanges 28. In the smooth skin form of vehicle body shown in FIG. 1, the posts are disposed inwardly of the side panels 22, in which case the side or sheet panels 22 are secured by the integral rivet means 24 to the web portion 26. The sheets can run lengthwise of the trailer body or if they are in the form of separate panels running substantially vertically they may be made to overlap and be secured to the web portion 26 of each post or alternate posts by the integral rivet means 24, in which case the same will extend through two thicknesses of sheet and the web portion of the post. In the form of vehicle in which the posts are exterior of the side or sheet panels 22, the latter are secured by the integral rivet means to the lateral flanges 28 of the posts as shown in FIGS. 4 and 5. Here again, the sheets can extend longitudinally across the posts, as shown in FIGS. 4 and 5 or can be joined by seams which are disposed opposite the web portion 26 of the post.

The integral rivet means 24 can be used to join crystalline ductile metals, such as aluminum, copper, brass and certain steels. The integral rivet is produced by the sequential operations of punching, extruding and upending of the extruded material. The punch 30 is substantially cylindrical and has a head or free end 32 which is substantially planar and perpendicular to the axis of the punch. The punch is applied via a conventional press to the upper member, such as post flange 28 or web portion 26, while the latter is superimposed on the lower member or sheet 22. The lower member or sheet 22 is supported upon a die 34 having a throat 36 which narrows to a land having a circular opening 38 whose diameter $d_2$ is less than the diameter $d_1$ of the punch 30. Thus, the punch is pressed into the upper member 28 with sufficient force to shear substantially cylindrical opening 40 in the upper member while knocking a slug 42 of diameter $d_2$ out of the lower member 22 and at the same time extruding a rivet body 44 of the material of the upper member through the hole 46 formed in the lower member 22 by virtue of the removal of the slug 42 therefrom. Because the punch is substantially cylindrical and its free end or head is planar and substantially at right angles to the axis thereof, the forces tending to extrude the material of the upper member 28 laterally instead of axially through the hole 46 of the lower member are minimized. In other words the major force of the punch is directed axially through the hole 46 to cause more material to be extruded therethrough and thus provide a strong rivet body 44, the die land of reduced diameter acting to supply a back pressure on the extrudate to prevent the extrudate from punching out entirely.

In the next operation, the die set 34 is replaced with an anvil 48 having a relatively shallow cavity 50 whose diameter exceeds the diameter $d_2$ of the extrudate or rivet body 44. The press is again operated and the entry of the punch 30 into the cylindrical opening 40 acts as a hammer whereby the anvil upends the rivet body 44 to form a button or head 52 which secures the members together.

In order for the integral rivet to be as structurally strong as possible, its diameter $d_2$ should be in the order of magnitude of 3 to 5 times the thickness of the lower sheet 22, and the diameter $d_1$ of the punch should be in the order of magnitude of 5% larger than the rivet diameter $d_2$. The upper member 26 or 28 should be at least approximately 2½ times as thick as the lower member or sheet 22 and the punch should penetrate the upper sheet to a point where the remaining thickness of the upper sheet beneath the punch 30 is at least equal to the thickness $t$ of the thinner sheet.

Integral rivets were formed by the method herein described employing an upper member of .250" thickness and a lower member of .063" thickness, both members being made of 6061–T6 aluminum alloy. A cylindrical punch with a diameter of .281" was applied to the upper member which was superimposed on the lower member over a die whose land diameter was .275". The punch penetrated the upper member to a depth of ⅛" to ⁷⁄₃₂". After upending or peening the extrudate, the integral rivets so formed were subjected to test which indicated that ³⁄₁₆" diameter conventional rivets failed at 2880 pounds but the integral rivets did not and under static loads, the integral rivet joints were approximately 100% stronger than conventional rivet joints.

The integral rivet of the instant invention does not employ a round-ended punch with concave shoulders extending outwardly thereof nor an annular depression around the outer end of the hole formed in the lower member, as disclosed in the Schmidt Patent No. 2,713,197. Using a substantially cylindrical punch with a planar head in the manner set forth hereinabove provides a number of advantages over Schmidt. For example, the round-ended punch of Schmidt causes the material of the upper member to be displaced laterally as well as axially through the hole of the lower member, whereas in the instant invention the extruding force is substantially axially through the hole to provide a stronger rivet body. When it is necessary to employ long upper and lower sheets and provide a plurality of rivets, the use of round-ended punches causes the sheets to curl due to differential displacements of material, whereas this does not occur with the instant invention. Also with the instant invention, a press with less tonnage is required to make the rivets than that required with the use of round-ended punches.

The invention is applicable to the joinder of an upper member or sheet to two thicknesses of sheet in accordance with the principles and parameters set forth hereinabove. Also, where desired adhesives or sealants may be interposed between the sheets before they are joined by the integral rivet means described herein. There are times when the upper and lower members, while both being crystalline ductible metals, are nevertheless dissimilar. In such cases corrosion due to electrolytic processes may occur at the juncture of the metals. By interposing a coating of anti-electrolytic material, such as Mylar, a polyester film commercially available from the Du Pont Co., between the sheets such electrolytic corrosion is avoided. It has been found that after the sequential punching, extruding and upending of the extrudate to form the integral rivet, the coating still remains intact to cover the interface between the rivet body and the hole 46 in the lower member through which it extends and also the interface between the head 52 of the rivet and the under surface of the lower member.

While preferred embodiments of the invention are here shown and described, minor variations may be made by skilled artisans without departing from the spirit of the invention and the scope of the appended claims.

I claim:
1. In a vehicle body, a pair of crystalline ductible metallic sheets of unequal thicknesses joined by integral rivets, each rivet including a body portion integral with and extruded from the thicker sheet and extending through a hole formed in the thinner sheet, a head on the free end of said body portion of said rivet extending radially beyond said hole, and a recess in the thicker sheet opposite said body portion of said rivet having a peripheral wall which is non-tapered and a cross-sectional area exceeding that of said body portion of said rivet.

2. In a vehicle body, a pair of crystalline ductible metallic sheets of unequal thicknesses joined by integral rivets, each rivet including a body portion integral with and extruded from the thicker sheet and extending through a hole formed in the thinner sheet, a head on the free end of said body portion extending radially beyond said hole, and a substantially cylindrical recess in the thicker sheet opposite said body portion whose axis is substantially normal to the plane of the thicker sheet and whose cross-sectional area exceeds that of said body portion of said rivet.

3. The combination of claim 2 wherein the diameter of said body portion of said rivet is about 3 to 5 times the thickness of the thinner sheet.

4. The combination of claim 3 wherein the portion of said body portion which does not extend into said hole and is below said recess is at least as thick as the thinner sheet.

5. The combination of claim 2 wherein the diameter of said recess exceeds that of said body portion by about 5%.

6. An over-the-road vehicle body including side walls having spaced vertical posts and sheets made of dissimilar metals, and integral rivet means joining said sheets to said posts, each of said means including a portion integral with a post and projecting through a sheet, the projected end of said portion being headed to extend laterally beyond said portion and thereby complete the joint, and a polyester film between said post and sheet, said film covering the interface between said extruded portion as it projects through said sheet and the interface between said headed end and said sheet.

References Cited by the Examiner

UNITED STATES PATENTS

| | | | |
|---|---|---|---|
| 1,128,532 | 2/15 | Schmidt | 29—432 |
| 1,252,289 | 1/18 | Murray. | |
| 2,126,161 | 8/38 | Woodward. | |
| 2,713,197 | 7/55 | Schmidt | 29—432 |
| 2,746,789 | 5/56 | Ridgway | 296—29 |
| 2,749,606 | 6/56 | Donahue | 29—432 |
| 2,758,870 | 8/56 | Nailinger | 296—28 |
| 2,936,478 | 5/60 | Hegji. | |
| 3,028,192 | 4/62 | Jewell | 296—28 |
| 3,075,802 | 1/63 | Lowe | 296—29 |

A. HARRY LEVY, *Primary Examiner.*